(12) United States Patent
Yang et al.

(10) Patent No.: US 11,214,850 B2
(45) Date of Patent: Jan. 4, 2022

(54) PREDICTION CONTROL METHOD AND SYSTEM FOR COMPONENT CONTENTS IN RARE EARTH EXTRACTION PROCESS

(71) Applicant: East China Jiaotong University, Nanchang (CN)

(72) Inventors: Hui Yang, Nanchang (CN); Ying Wang, Nanchang (CN); Rongxiu Lu, Nanchang (CN); Jianyong Zhu, Nanchang (CN); Gang Yang, Nanchang (CN)

(73) Assignee: East China Jiaotong University, Nanchong (CN)

( * ) Notice: Subject to any disclaimer, the term of this patent is extended or adjusted under 35 U.S.C. 154(b) by 461 days.

(21) Appl. No.: 16/406,293

(22) Filed: May 8, 2019

(65) Prior Publication Data

US 2020/0239982 A1    Jul. 30, 2020

(30) Foreign Application Priority Data

Jan. 28, 2019 (CN) .......................... 201910080799.2

(51) Int. Cl.
  *C22B 59/00* (2006.01)
  *C22B 61/00* (2006.01)
  (Continued)

(52) U.S. Cl.
  CPC .............. *C22B 59/00* (2013.01); *C22B 61/00* (2013.01); *G05B 13/027* (2013.01);
  (Continued)

(58) Field of Classification Search
  CPC ....... C22B 59/00; C22B 61/00; G05B 13/027; G05B 13/048; G06B 2219/32335;
  (Continued)

(56) References Cited

U.S. PATENT DOCUMENTS

| 2015/0227841 A1* | 8/2015 | Laing | .................... E21B 49/003 706/19 |
| 2016/0230699 A1* | 8/2016 | Bartlett | ..................... F02G 5/02 |

* cited by examiner

*Primary Examiner* — Shane D Woolwine
(74) *Attorney, Agent, or Firm* — IP Attorneys Group; David Chen

(57) ABSTRACT

The present invention discloses a prediction control method and system for component contents in a rare earth extraction process. The prediction control method includes: establishing an Elman neural network model of a rare earth extraction process; obtaining a predicted output value of the rare earth extraction process through the Elman neural network model of the rare earth extraction process; calculating an optimal set value through steady-state optimization; dynamically predicting an extractant flow increment and a detergent flow increment based on the predicted output value and the optimal set value; and controlling component contents in the rare earth extraction process according to the extractant flow increment and the detergent flow increment. According to the present invention, an optimal setting problem of a set point is solved through steady-state optimization calculation, and then an optimal control effect is achieved in combination with a dynamic prediction control method, thereby achieving optimal setting control over the component contents in the rare earth extraction process, and ensuring the product quality of the rare earth extraction process.

10 Claims, 8 Drawing Sheets

(51) Int. Cl.
*G06N 20/10* (2019.01)
*G05B 13/02* (2006.01)
*G06N 3/08* (2006.01)
*G05B 13/04* (2006.01)
*G06N 3/02* (2006.01)

(52) U.S. Cl.
CPC ............. *G05B 13/048* (2013.01); *G06N 3/02* (2013.01); *G06N 3/08* (2013.01); *G06N 20/10* (2019.01)

(58) Field of Classification Search
CPC ............ G06N 3/02; G06N 3/049; G06N 3/08; G06N 20/00; G06N 20/10; G06N 20/20
See application file for complete search history.

PREDICTION CONTROL METHOD AND SYSTEM FOR COMPONENT CONTENTS IN RARE EARTH EXTRACTION PROCESS

This application claims priority to Chinese application number 201910080799.2, filed Jan. 28, 2019, with a title of PREDICTION CONTROL METHOD AND SYSTEM FOR COMPONENT CONTENTS IN RARE EARTH EXTRACTION PROCESS. The above-mentioned patent application is incorporated herein by reference in its entirety.

TECHNICAL FIELD

The present invention relates to the field of process control, and in particular, to a prediction control method and system for component contents in a rare earth extraction process.

BACKGROUND

With excellent physical, chemical, and electrical properties, rare earth elements are widely applied in the conventional industrial field, military field, and high-tech field, and promote the technical progress of the related industries. In the rare earth industry in China, a single high-purity rare earth element is generally obtained using a solvent extraction method. However, for a multi-variable system with a characteristic of extremely complex operating condition changes in the rare earth extraction process industry, the extraction and separation of the rare earth element is a nonlinear, strong-coupling, severely lagged complex industrial process. It is impossible to describe the process by using a simple mechanism model, and it is also difficult to design a high-efficient controller to control the process. Currently, the rare earth extraction and separation industrial process has a relatively low degree of automation. On-site online detection has not been implemented yet. The extraction process still needs to be controlled by seasoned operating personnel based on their own experience. Through analysis on the rare earth extraction industrial process, an important index for measuring the quality of products at outlets of both ends of the process is obtained, that is, the distribution of component contents in an extraction tank. Therefore, the study on how to ensure that the component contents at monitoring points at both ends of the rare earth element extraction and separation process reach optimal set values is of great significance for guaranteeing the improvement in the product quality.

In the rare earth extraction process, modeling manners can be generally classified into two types, that is, static modeling and dynamic modeling. Establishment of a static model is mainly in accordance with a cascade extraction equilibrium theory, and dynamic characteristics in the extraction process are not taken into account in the static model established in this manner. In the existing technology, a bilinear model for the rare earth extraction process is established by means of segmented aggregation modeling in accordance with the principle of rare earth material equilibrium. However, an inter-stage interaction mode of the extraction tank is not taken into consideration, and the model still has a large error.

If the rare earth element extraction mainly employs a cascade extraction and separation technique, the rare earth extraction process is a multi-input multi-output nonlinear process that is particularly complex, and is affected by many factors. In order to better optimize and control the rare earth extraction process, a more accurate description model for the rare earth extraction process needs to be established.

With the development of the industrial process technology, the efficiency and stability of the rare earth industrial process production as well as the purity of the rare earth product also needs to meet increasingly higher requirements. Therefore, the control technology related to component contents in the rare earth extraction process is also developed to a certain degree. Conventional control technologies include technologies based on a PID control algorithm, and based on rare earth extraction process control algorithms such as fuzzy control, an expert system, and adaptive robust control. In the control technology based on the PID control algorithm, during control over feeding flow rates of the rare earth, influence of each flow rate on monitoring-stage component content set values is ignored, thus failing to achieve an expected effect. Based on the rare earth extraction process control algorithms such as fuzzy control and the expert system, the input of each stage is made fuzzy, and at the same time, the influence of each flow rate on the monitoring-stage component content set values is taken into consideration, thus improving the control effect. However, the fuzzy control and expert system control are implemented by simulating actual experience of experts, and when an operating condition of an extraction site changes or is disturbed, the control strategy cannot adjust parameters online in time. Although the adaptive robust control method can take system stability into consideration globally, it cannot measure dynamic performance of the extraction process. As can be seen, none of the existing control algorithms can meet an optimal control standard.

SUMMARY

An objective of the present invention is to provide a prediction control method and system for component contents in a rare earth extraction process, so as to overcome the defects of the existing control algorithms and meet an optimal control standard.

To achieve the above objective, the present invention provides the following solutions.

A prediction control method for component contents in a rare earth extraction process includes the following steps:

establishing an Elman neural network model of a rare earth extraction process;

obtaining a predicted output value of the rare earth extraction process through the Elman neural network model of the rare earth extraction process;

calculating an optimal set value through steady-state optimization;

dynamically predicting an extractant flow increment and a detergent flow increment based on the predicted output value and the optimal set value; and controlling component contents in the rare earth extraction process according to the extractant flow increment and the detergent flow increment.

Optionally, the establishing an Elman neural network model of a rare earth extraction process specifically includes:

establishing an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

where u(k−1) represents an input of the Elman neural network model, $u(k-1)=[u_1(k-1), u_2(k-1)]^T$; y(k) represents a predicted output value, $y(k)=[y_1(k),y_2(k)]^T$, $y_1(k)$ represents a predicted output value in an extraction stage, and $y_2(k)$ represents a predicted output value in a washing stage; x(k) represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and training the Elman neural network model, and obtaining the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process.

Optionally, the calculating an optimal set value through steady-state optimization specifically includes:

establishing an economic performance optimization target function of the component contents in the rare earth extraction process:

$$\min M = c_1 u_1 + c_2 u_2,$$

$$\text{s.t.} \begin{cases} u_{min} \leq u \leq u_{max} \\ y_{min} \leq y \leq y_{max} \\ \Delta u_m \leq \Delta u \leq \Delta u_{max} \end{cases},$$

where $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, $u_{max}$ and $u_{min}$ are an upper-bound constraint and a lower-bound constraint of the operation variable u respectively, $\Delta u$ represents an operation variable increment, and $\Delta u_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and solving the economic performance optimization target function, to obtain the optimal set value.

Optionally, the dynamically predicting an extractant flow increment and a detergent flow increment based on the predicted output value and the optimal set value specifically includes:

establishing a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

where P represents a maximum prediction length, q(j) represents an error weighting coefficient that is j steps ahead, y(k+j) represents a predicted output value that is j steps ahead, and w(k+j) represents a tracked reference trajectory that is j steps ahead; $w(k+k)=\alpha w(k+j-1)+(1-\alpha)y_r(k+j)$, where α is a softness factor, 0<α<1, w(k+j−1) represents a tracked reference trajectory that is (j−1) steps ahead, and $y_r(k+j)$ represents an optimal set value that is j steps ahead; M represents a control length, r(j) represents a control weighting coefficient that is j steps ahead, and Δu(k+j−1) represents a control increment that is (j−1) steps ahead; and solving the component content deviation optimization target function to obtain the extractant flow increment and the detergent flow increment.

Optionally, the solving the component content deviation optimization target function to obtain the extractant flow increment and the detergent flow increment specifically includes:

vectorizing the component content deviation optimization target function to obtain a vector form of the component content deviation optimization target function: $J=(Y-W)^T Q(Y-W)+R\Delta U^T \Delta U$, where W represents a tracked reference trajectory vector, $W=[w(k+1), w(k+2), \ldots, w(k+P)]^T$, Y represents a predicted output value vector, ΔU represents a control increment vector, Q represents a target weighting matrix, and R represents a control weighting matrix;

substituting Y=GΔU+F into the vector form of the component content deviation optimization target function to obtain a solution function, $$J = (G\Delta U + F - W)^T Q(G\Delta U + F - W) + R\Delta U^T \Delta U$$
$$= (W - F)^T Q(W - F) - (W - F)^T QG\Delta U - \Delta U^T G^T Q(W - F) +$$
$$\Delta U^T G^T QG\Delta U + \Delta U^T R\Delta U,$$

where $F=[f(k+1), f(k+2), \ldots, f(k+P)]^T$ is a transfer function value vector of a hidden-layer neuron of the Elman neural network model of the rare earth extraction process, $f(k+1), f(k+2), \ldots, f(k+P)$ represent transfer function values of the hidden-layer neuron of the Elman neural network model of the rare earth extraction process which are 1 step ahead, 2 steps ahead, and P steps ahead respectively, and $G \in R^{(2 \times M) \times (2 \times M)}$ represents a control matrix; and making ∂J/∂ΔU=0, solving the solution function to obtain a control increment optimal value ΔU*, where $\Delta U^* = (G^T QG+RI)^{-1} QG^T(W-F)$, and obtaining the extractant flow increment and the detergent flow increment, I being a unit matrix.

A prediction control system for component contents in a rare earth extraction process includes:

a model establishment module, configured to establish an Elman neural network model of a rare earth extraction process;

an output value prediction module, configured to obtain a predicted output value of the rare earth extraction process through the Elman neural network model of the rare earth extraction process;

an optimal set value calculation module, configured to calculate an optimal set value through steady-state optimization;

a component content increment prediction module, configured to dynamically predict an extractant flow increment and a detergent flow increment based on the predicted output value and the optimal set value; and a process control module, configured to control component contents in the rare earth extraction process according to the extractant flow increment and the detergent flow increment.

Optionally, the model establishment module specifically includes:

a model establishment sub-module, configured to establish an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

where $u(k-1)$ represents an input of the Elman neural network model, $u(k-1)=[u_1(k-1),u_2(k-1)]^T$; $y(k)$ represents a predicted output value, $y(k)=[y_1(k),y_2(k)]^T$, $y_1(k)$ represents a predicted output value in an extraction stage, and $y_2(k)$ represents a predicted output value in a washing stage; $x(k)$ represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and a training sub-module, configured to train the Elman neural network model, and obtain the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process.

Optionally, the optimal set value calculation module specifically includes:

an economic performance optimization target function establishment sub-module, configured to establish an economic performance optimization target function of the component contents in the rare earth extraction process:

$$\min M = c_1 u_1 + c_2 u_2,$$

$$\text{s.t.} \begin{cases} u_{min} \leq u \leq u_{max} \\ y_{min} \leq y \leq y_{max} \\ \Delta u_{min} \leq \Delta u \leq \Delta u_{max} \end{cases},$$

where $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, $u_{max}$ and $u_{min}$ are an upper-bound constraint and a lower-bound constraint of the operation variable $u$ respectively, $\Delta u$ represents an operation variable increment, and $\Delta u_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and an economic performance optimization target function solving sub-module, configured to solve the economic performance optimization target function, to obtain the optimal set value.

Optionally, the component content increment prediction module specifically includes a component content deviation optimization target function establishment sub-module, configured to establish a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

where $P$ represents a maximum prediction length, $q(j)$ represents an error weighting coefficient that is $j$ steps ahead, $y(k+j)$ represents a predicted output value that is $j$ steps ahead, and $w(k+j)$ represents a tracked reference trajectory that is $j$ steps ahead; $w(k+j)=\alpha w(k+j-1)+(1-\alpha)y_r(k+j)$, where $\alpha$ is a softness factor, $0<\alpha<1$; $w(k+j-1)$ represents a tracked reference trajectory that is $(j-1)$ steps ahead, and $y_r(k+j)$ represents an optimal set value that is $j$ steps ahead; $M$ represents a control length, $r(j)$ represents a control weighting coefficient that is $j$ steps ahead, and $\Delta u(k+j-1)$ represents a control increment that is $(j-1)$ steps ahead; and a component content deviation optimization target function solving sub-module, configured to solve the component content deviation optimization target function to obtain the extractant flow increment and the detergent flow increment.

Optionally, the component content deviation optimization target function solving sub-module specifically includes:

a function vectorization unit, configured to vectorize the component content deviation optimization target function to obtain a vector form of the component content deviation optimization target function: $J=(Y-W)^T Q(Y-W)+R\Delta U^T \Delta U$, where $W$ represents a tracked reference trajectory vector, $W=[w(k+1), w(k+2), \ldots, w(k+P)]^T$, $Y$ represents a predicted output value vector, $\Delta U$ represents a control increment vector, $Q$ represents a target weighting matrix, and $R$ represents a control weighting matrix;

a solution function obtaining unit, configured to substitute $Y=G\Delta U+F$ into the vector form of the component content deviation optimization target function to obtain a solution function, $$J = (G\Delta U + F - W)^T Q(G\Delta U + F - W) + R\Delta U^T \Delta U$$
$$= (W - F)^T Q(W - F) - (W - F)^T QG\Delta U - \Delta U^T G^T Q(W - F) +$$
$$\Delta U^T G^T QG\Delta U + \Delta U^T R\Delta U,$$

where $F[f(k+1), f(k+2), \ldots, f(k+P)]^T$ is a transfer function value vector of a hidden-layer neuron of the Elman neural network model of the rare earth extraction process, $f(k+1)$, $f(k+2), \ldots, f(k+P)$ represent transfer function values of the hidden-layer neuron of the Elman neural network model of the rare earth extraction process which are 1 step ahead, 2 steps ahead, and $P$ steps ahead respectively, and $G \in R^{(2 \times M) \times (2 \times M)}$ represents a control matrix; and a solving unit, configured to make $\partial J/\partial \Delta U=0$, solve the solution function to obtain a control increment optimal value $\Delta U^*$, where $\Delta U^*=(G^T QG+RI)^{-1}QG^T(W-F)$, and obtain the extractant flow increment and the detergent flow increment, I being a unit matrix.

According to specific embodiments provided in the present invention, the present invention discloses the following technical effects:

The present invention discloses a prediction control method and system for component contents in a rare earth extraction process. According to the prediction control method provided in the present invention, first of all, an Elman neural network model of a rare earth extraction process is established, where a nonlinear relationship of a CePr/Nd extraction and separation process is described by using the Elman neural network model, and the Elman neural network model includes a feedback link therein, which can memorize status information of a previous moment and express a time delay between an input quantity and an output quantity, thus being capable of adapting to a time-variant characteristic; then, an optimal set value is calculated through steady-state optimization; besides, an extractant flow increment and a detergent flow increment are predicted dynamically based on the predicted output value and the optimal set value, and the component contents in the rare earth extraction process are controlled according to the extractant flow increment and the detergent flow increment. An optimal setting problem of a set point is solved through steady-state optimization calculation, and then an optimal control effect is achieved in combination with a dynamic prediction control method, thereby achieving optimal setting control over the component contents in the rare earth extraction process, and ensuring the product quality of the rare earth extraction process.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

An objective of the present invention is to provide a prediction control method and system for component contents in a rare earth extraction process, so as to overcome the defects of the existing control algorithms and meet an optimal control standard.

To make the foregoing objectives, features, and advantages of the present invention easier to understand, the following describes the present invention in further detail with reference to the accompanying drawings and specific embodiments.

Embodiment 1

Embodiment 1 of the present invention provides a prediction control method for component contents in a rare earth extraction process.

Figure 1:
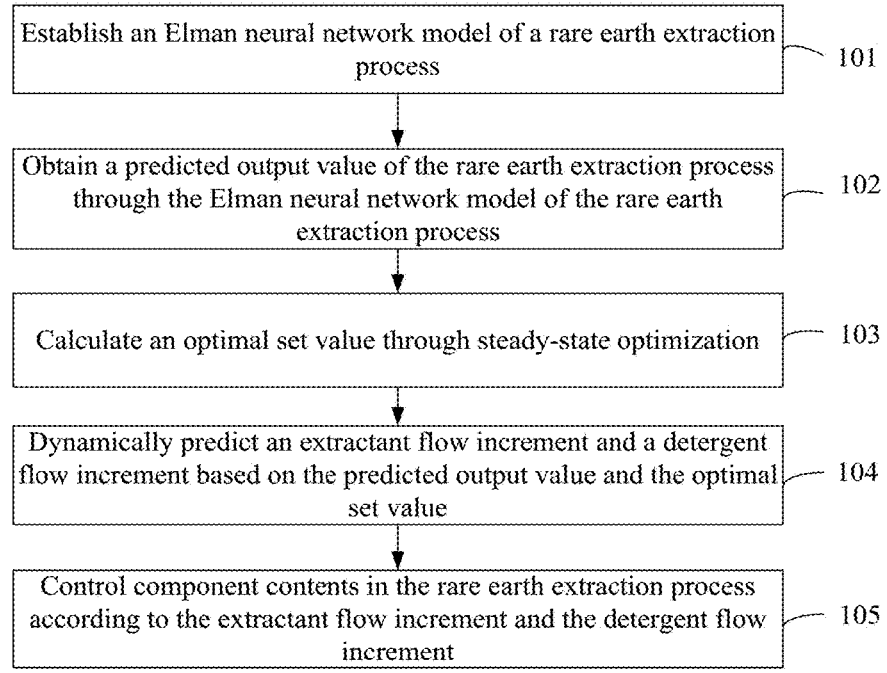
FIG. 1 is a flowchart of a prediction control method for component contents in a rare earth extraction process according to the present invention.

As shown in FIG. 1, the prediction control method includes the following steps: step 101, establishing an Elman neural network model of a rare earth extraction process; step 102, obtaining a predicted output value of the rare earth extraction process through the Elman neural network model of the rare earth extraction process; step 103, calculating an optimal set value through steady-state optimization; step 104, dynamically predicting an extractant flow increment and a detergent flow increment based on the predicted output value and the optimal set value; and step 105, controlling component contents in the rare earth extraction process according to the extractant flow increment and the detergent flow increment.

Figure 2:
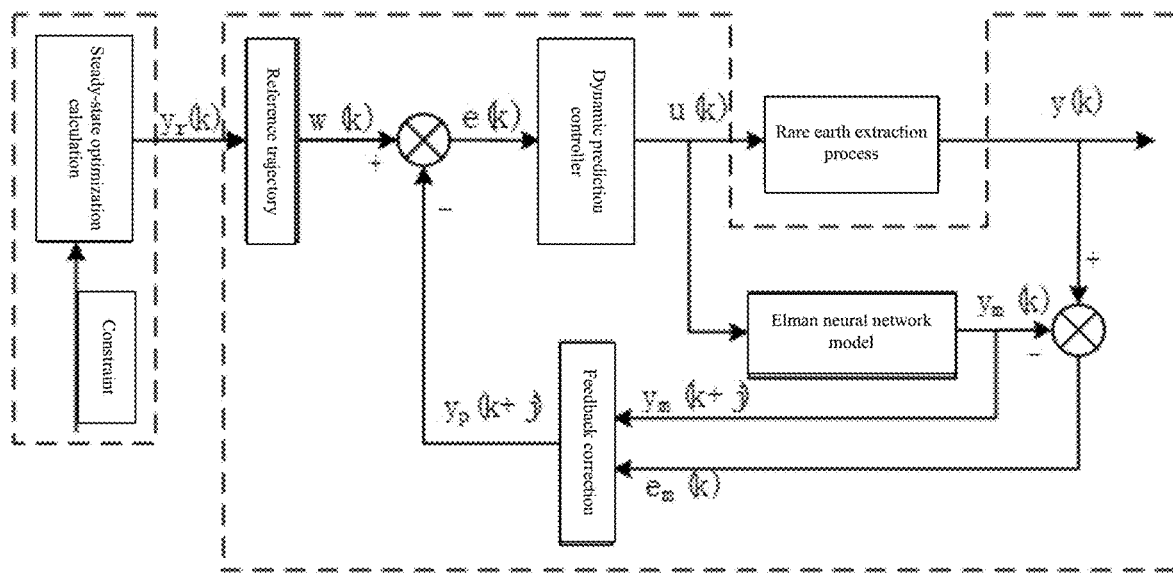
FIG. 2 is a schematic diagram of a principle of a prediction control method for component contents in a rare earth extraction process according to the present invention.

Specifically, as shown in FIG. 2, $y_r(k)$ is an optimal set value of a monitoring-stage component content after steady-state target optimization calculation, and $w(k)$ is a tracked reference trajectory. An error $e_m(k)$ is obtained according to a predicted output $y_m(k)$ of the Elman neural network model of the rare earth extraction process and an on-site actual process output $y(k)$. Feedback correction is performed on parameters of the Elman neural network model of the rare earth extraction process according to a future predicted output $y_m(k+j)$ and an error at the current moment, to obtain a corrected predicted output value $y_p(k+j)$. Then, an error $e(k)$ between the set value and the corrected predicted output value is fed back to a dynamic prediction controller, and an optimal control quantity $u(k)$ of the process is obtained through calculation, thereby controlling the rare earth extraction process.

In the present invention, in view of the characteristics of complexity and uncertainty of a rare earth extraction process, a component content double-layer structured prediction controller based on an Elman neural network model is designed. An optimal setting problem of a set point is solved through steady-state optimization calculation, and then an optimal control effect is achieved in combination with a dynamic prediction control method, thereby achieving optimal setting control over the component contents in the rare earth extraction process, and ensuring the product quality of the rare earth extraction process.

Embodiment 2

Embodiment 2 of the present invention provides a preferred implementation manner of the prediction control method for component contents in a rare earth extraction process. However, the implementation of the present invention is not limited to the implementation manner defined in Embodiment 2 of the present invention.

The objective of the present invention is to establish a high-precision Elman neural network model for a nonlinear system with a complex operating condition characteristic of rare earth extraction, and design a component content double-layer structured prediction controller based on the model, so that an optimal setting problem of set points of monitoring-stage component contents is solved through steady-state optimization calculation, and then a reference trajectory is tracked by using a dynamic prediction control algorithm. The technical solution is as follows: In view of the complex operating condition characteristics of nonlinearity, strong coupling, and a severe lag of the rare earth extraction process, an Elman neural network model description method is proposed. With reference to dynamic process data of rare earth elements CePr/Nd in different operation stages of the extraction process, a rare earth extraction process identification model is established by using an Elman neural network; it is proposed to use a double-layer structured prediction control method for component contents in a rare earth extraction process to implement optimal setting control of the rare earth extraction process.

Figure 3:
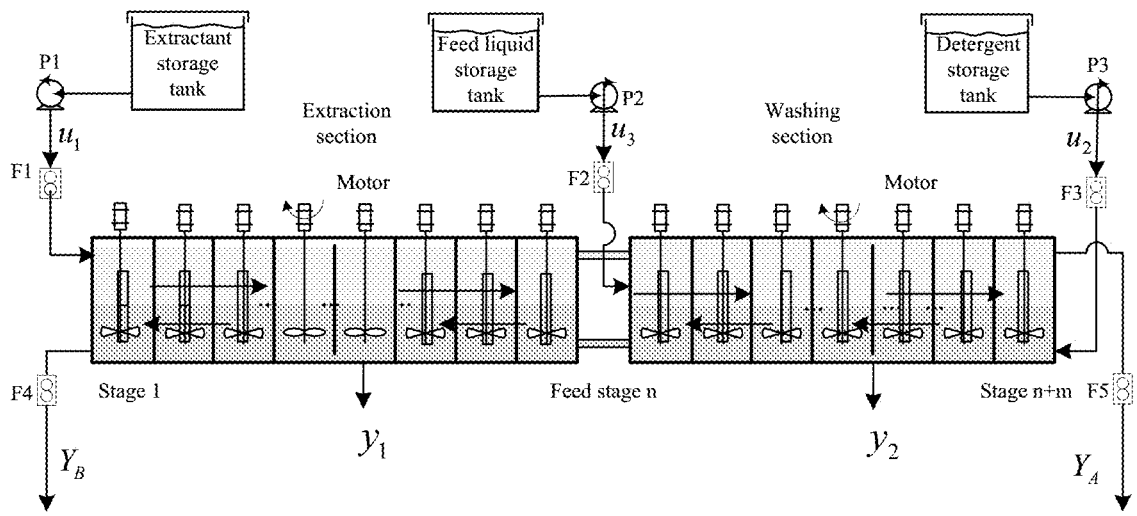
FIG. 3 is a flowchart of a rare earth extraction process according to the present invention.

Because the rare earth elements have similar chemical properties and a small separation coefficient, the rare earth cascade extraction and separation process shown in FIG. 3 is an effective measure to obtain a single high-purity rare earth element. In an industrial field, the value of a feed liquid flow is usually determined by the actual yield of an industrial product, and basically remains constant under the premise of guaranteed benefits. Therefore, the rare earth extraction process can be described as the following nonlinear functional relation:

$$\begin{cases} y_1(k) = f_1[y_1(k-1), u_1(k), u_2(k)] + \zeta_1 \\ y_2(k) = f_2[y_2(k-1), u_1(k), u_2(k)] + \zeta_2 \end{cases}$$

In the formula, $\zeta_1$, $\zeta_2$ represent uncertain factors in the extraction process respectively; monitoring-stage component contents $y_1, y_2$ in an extraction stage and a washing stage meet:

$$\begin{cases} y_{1min} \leq y_1(t) \leq y_{1max} \\ y_{2min} \leq y_2(t) \leq y_{2max} \end{cases}$$

where $y_{1min}, y_{1max}, y_{2min}, y_{1max}$, represent an upper bound and a lower bound of a component content of a monitoring point respectively.

Figure 4:
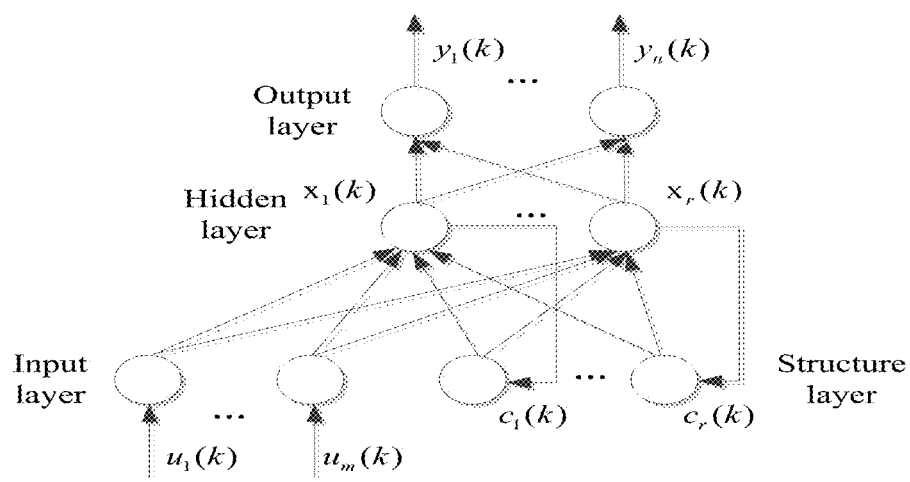
FIG. 4 is a schematic diagram of an Elman neural network model of a rare earth extraction process according to the present invention.

The study on the rare earth extraction process is usually considered as a time sequence problem. The process is too complex, and it is impossible to obtain relationships between component contents and an extractant flow and between component contents and a detergent flow through mechanism analysis. Therefore, the problem is generally solved by establishing a neural network prediction model. In the present invention, a nonlinear relationship of a CePr/Nd extraction and separation process is described by using the Elman neural network model, and the neural network includes a feedback link therein, which can memorize status information of a previous moment and express a time delay between an input quantity and an output quantity, so that the system is capable of adapting to a time-variant characteristic. Accordingly, the establishing an Elman neural network model of a rare earth extraction process specifically includes:

establishing an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

where u(k−1) represents an input of the Elman neural network model, $u(k-1)=[u_1(k-1), u_2(k-1)]^T$; y(k) represents a predicted output value, $y(k)=[y_1(k), y_2(k)]^T$, $y_1(k)$ represents a predicted output value in an extraction stage, and $y_2(k)$ represents a predicted output value in a washing stage; x(k) represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and training the Elman neural network model, and obtaining the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process. The Elman neural network model of the rare earth extraction process is as shown in FIG. 4.

It is proposed in the present invention that the optimal setting control over the rare earth extraction process is implemented by using a double-layer structured prediction control method for component contents in a rare earth extraction process. The double-layer structured prediction control includes two parts: a steady-state optimization design layer on the left side gives an optimal set value of a monitoring-stage component content in a rare earth extraction tank, and a dynamic control layer on the right side implements tracking and control over a target reference trajectory of steady-state optimization by using a prediction controller.

From the perspective of process control and optimization, the rare earth extraction process is a multi-variable process with complex characteristics such as strong coupling, a large lag, and nonlinearity. Changes in the feed liquid flow, the extractant flow, the detergent flow, and the like are major interference factors of the stable and efficient operation of the rare earth extraction process. In a control process of the practical rare earth extraction industry, most control operations are completed by experienced staff. Different personal experience and operation habits as well as different control adjustment duration makes it difficult to for parameters of the industrial process to achieve relative stability, results in poor economic effectiveness of the rare earth extraction process, and at the same time, also increases the workload of the staff. Therefore, by taking economic performance indexes and a control target requirement into consideration comprehensively, the present invention introduces a double-layer structured control system to improve the control and optimization of the rare earth extraction process.

The feed liquid flow, the extractant flow, the detergent flow, and other factors all have a certain influence on the operating cost of the rare earth extraction process. In the practical industrial production, the value of the feed liquid flow is usually determined by the yield of the product, and basically remains constant in the extraction process. Therefore, the extractant flow and the detergent flow are major economic performance indexes in the present invention.

Specifically, the calculating an optimal set value through steady-state optimization specifically includes: establishing an economic performance optimization target function of the component contents in the rare earth extraction process:

$$\min M = c_1 u_1 + c_2 u_2,$$
$$s.t. \begin{cases} u_{min} \leq u \leq u_{max} \\ y_{min} \leq y \leq y_{max} \\ \Delta u_{min} \leq \Delta u \leq \Delta u_{max} \end{cases},$$

where $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, $u_{max}$ and $u_{min}$ are an upper-bound constraint and a lower-bound constraint of the operation variable u respectively, $\Delta u$ represents an operation variable increment, and $\Delta u_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and solving the economic performance optimization target function to obtain the optimal set value.

The dynamically predicting an extractant flow increment and a detergent flow increment based on the predicted output value and the optimal set value specifically includes: in order to make a monitoring-stage component content better track an expected set value calculated through upper-layer steady-state optimization, taking into consideration an influence of current-moment operation variable u(k) on a future moment of the system in the target function, and establishing a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

where P represents a maximum prediction length, q(j) represents an error weighting coefficient that is j steps ahead, y(k+j) represents a predicted output value that is j steps ahead, and w(k+j) represents a tracked reference trajectory that is j steps ahead; $w(k+j)=\alpha w(k+j-1)+(1-\alpha)y_r(k+j)$, where $\alpha$ is a softness factor, $0<\alpha<1$; w(k+j−1) represents a tracked reference trajectory that is (j−1) steps ahead, and $y_r(k+j)$ represents an optimal set value that is j steps ahead; M represents a control length, r(j) represents a control weighting coefficient that is j steps ahead, and $\Delta u(k+j-1)$ represents a control increment that is (j−1) steps ahead; and solving the component content deviation optimization target function to obtain the extractant flow increment and the detergent flow increment.

The solving the component content deviation optimization target function to obtain the extractant flow increment and the detergent flow increment specifically includes: vectorizing the component content deviation optimization target function to obtain a vector form of the component content deviation optimization target function: $J=(Y-W)^T Q(Y-W)+R\Delta U^T \Delta U$ where W represents a tracked reference trajectory vector, $W=[w(k+1), w(k+2), \ldots, w(k+P)]^T$ Y represents a predicted output value vector, $Y=[y(k+1), y(k+2), \ldots, y(k+P)]^T$; y(k+1), y(k+2), and y(k+P) represent predicted output values that are 1 step ahead, 2 steps ahead, and P steps ahead respectively, $\Delta U$ represents a control increment vector, Q represents a target weighting matrix, Q=block-diag$\{Q_1, Q_2, \ldots, Q_p\}$, $Q_i$=diag$\{q_i(1), q_i(2), \ldots q_i(P)\}$, and R represents a control weighting matrix, R block-diag$\{R_1, R_2, \ldots, R_j$=diag$\{r_j(1), r_j(2), \ldots,\}$; substituting $Y=G\Delta U+F$ into the vector form of the component content deviation optimization target function to obtain a solution function, $$\begin{aligned} J &= (G\Delta U + F - W)^T Q(G\Delta U + F - W) + R\Delta U^T \Delta U \\ &= (W-F)^T Q(W-F) - (W-F)^T QG\Delta U - \Delta U^T G^T Q(W-F) + \\ &\quad \Delta U^T G^T QG\Delta U + \Delta U^T R\Delta U \end{aligned},$$

where $F[f(k+1), f(k+2), \ldots, f(k+P)]^T$ is a transfer function value vector of a hidden-layer neuron of the Elman neural network model of the rare earth extraction process, $f(k+1), f(k+2), \ldots, f(k+P)$ represent transfer function values of the hidden-layer neuron of the Elman neural network model of the rare earth extraction process which are 1 step ahead, 2 steps ahead, and P steps ahead respectively, and $G \in R^{(2 \times M) \times (2 \times M)}$ represents a control matrix; and making $\partial J / \partial \Delta U=0$, solving the solution function to obtain a control increment optimal value $\Delta U^*$, where $\Delta U^*=(G^T QG+RI)^{-1} QG^T(W-F)$, and obtaining the extractant flow increment and the detergent flow increment, I being a unit matrix.

Embodiment 3

In order to verify the technical effect of the technical solution of the present invention, Embodiment 3 of the present invention provides a simulation verification method.

In the implementation of the present invention, a CePr/Nd extraction and separation process is selected as a research object of the experiment, and the description of a cascade extraction process is shown in FIG. 3. Dynamic process data of the rare earth elements CePr/Nd in different operation stages of the extraction process is collected for modeling and simulation verification of the control.

Figure 5:
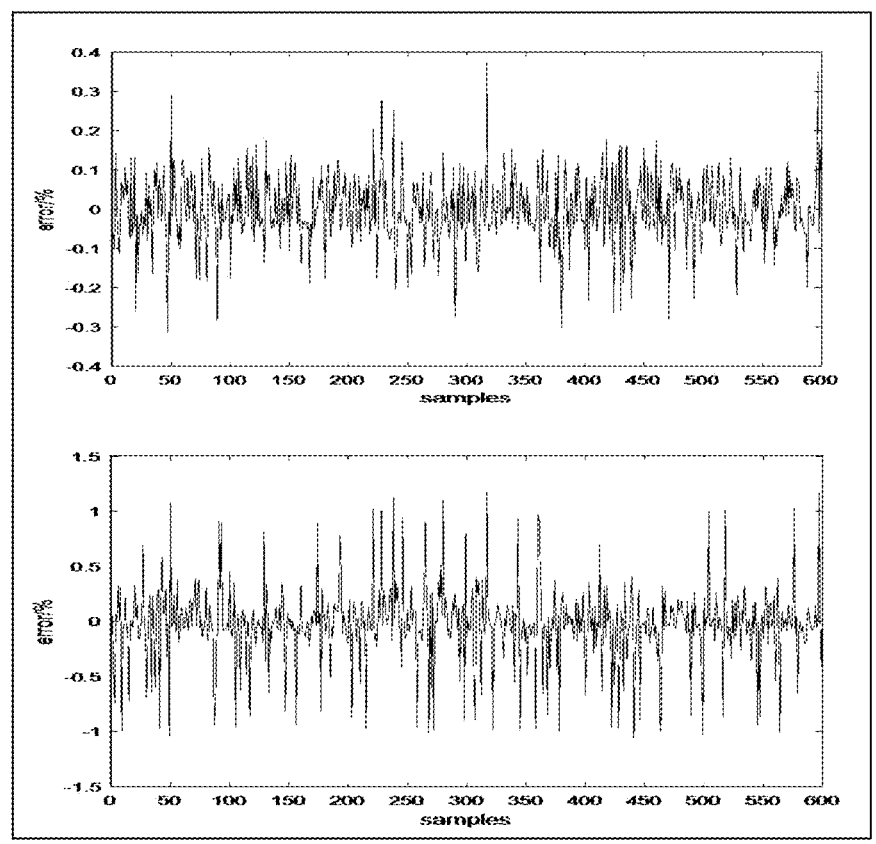
FIG. 5 is an error curve graph of the Elman neural network model of the rare earth extraction process.
Figure 6:
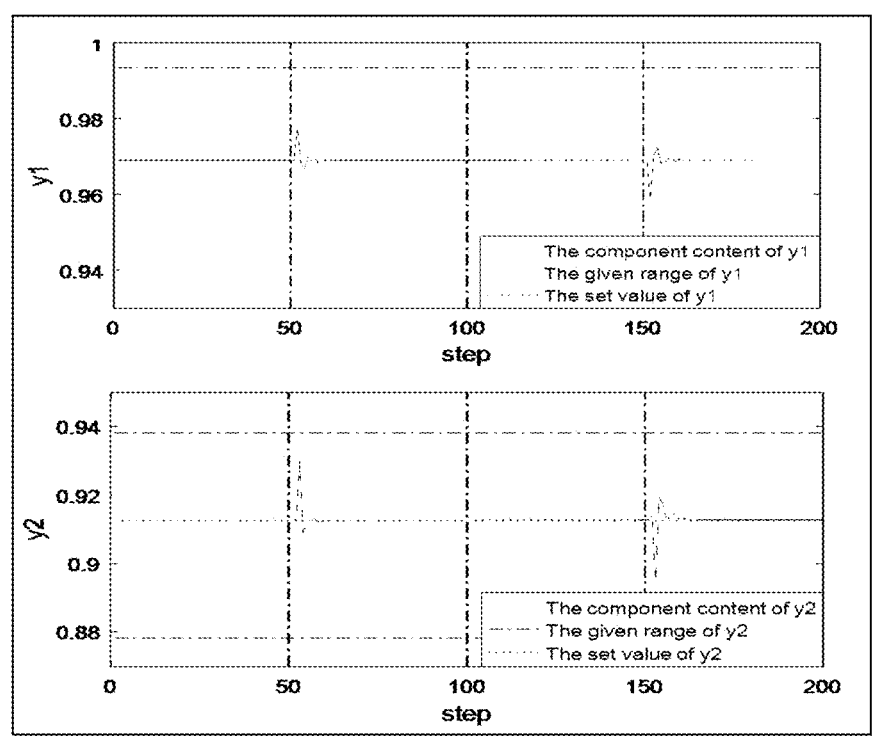
FIG. 6 is a curve graph of a first predicted component content.
Figure 7:
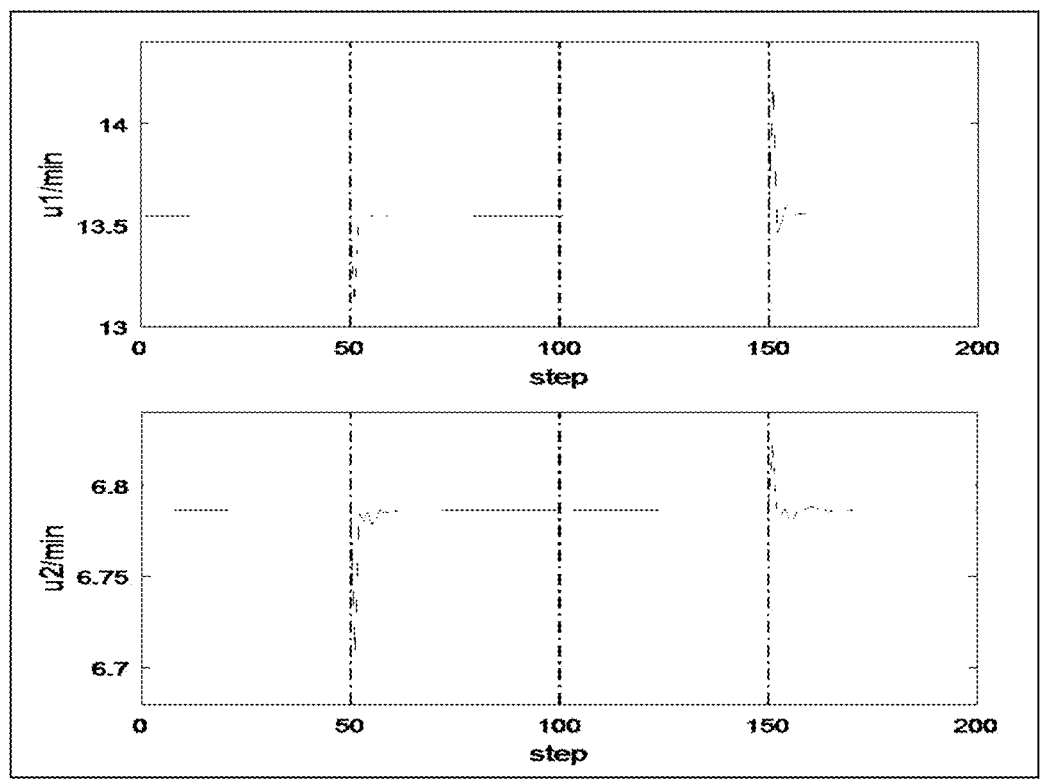
FIG. 7 is a control quantity curve graph corresponding to the curve graph of the first predicted component content.
Figure 8:
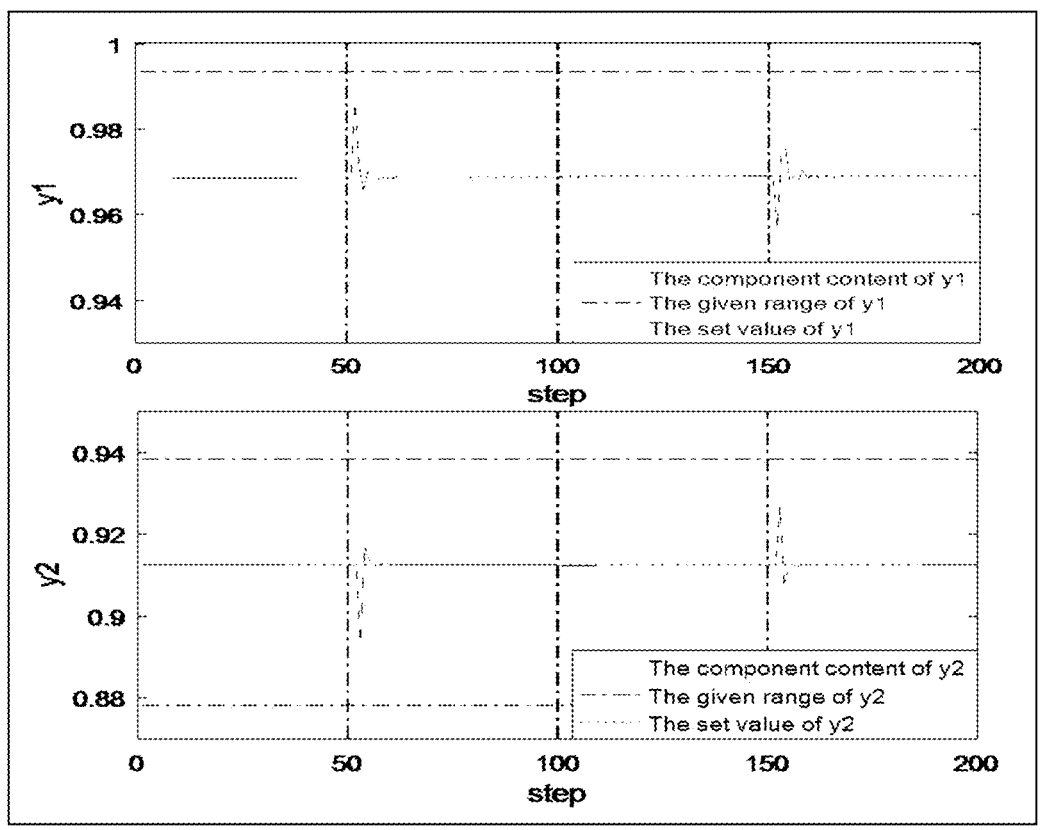
FIG. 8 is a curve graph of a second predicted component content.
Figure 9:
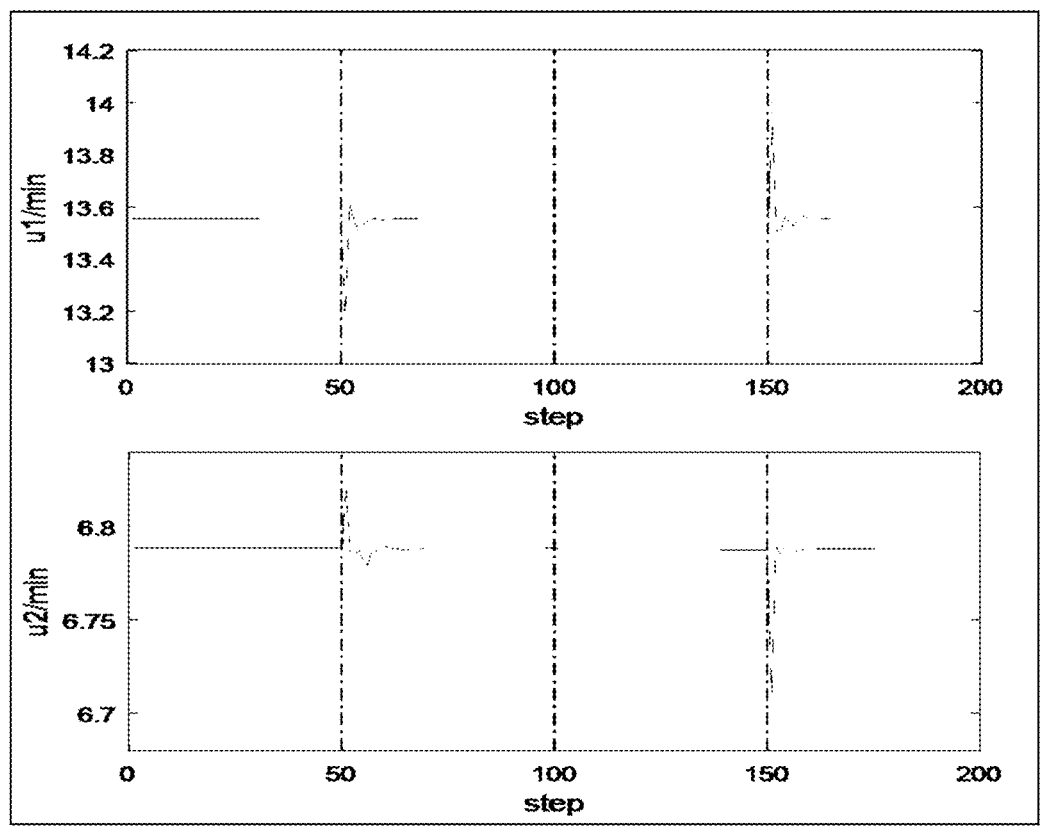
FIG. 9 is a control quantity curve graph corresponding to the curve graph of the second predicted component content.

FIG. 5 is an error curve of a component content prediction model. FIG. 5.a is a relative error curve of a model for component contents in an extraction section; and FIG. 5.b is a relative error curve of a model for component contents in a washing section. As shown in FIG. 5, relative errors of training and testing of the model for the CePr/Nd extraction and separation process are both within ±2%, indicating that this model can simulate, with high precision, nonlinear relationships between monitoring-stage component contents at both ends and each controlled flow in the rare earth extraction process.

Double-layer structured prediction control over the component contents in the CePr/Nd extraction process is performed by using the method according to the present invention, and FIG. 2 depicts the principle of the prediction control. According to the requirements of the CePr/Nd extraction and separation process, purity indexes of an easy-to-extract product and a difficult-to-extract product at outlets of both ends of the extraction tank should be kept at 0.9995 approximately; an optimal extraction quantity is s=2.5661; the total number of stages of the cascade extraction process is 60; the number of stages of the extraction section and the number of stages of the washing section are set to 26 and 34 respectively; the feed liquid flow $u_3$ is determined by the actual yield of the product, and is kept at 10 L·min-1 herein. In the practical industry, to ensure the purity at a water phase outlet and an organic phase outlet, the extraction section and the washing section each should be provided with a monitoring stage. The selection of the number of the sensitive monitoring point stages, that is, the selection of the optimal set value of the component content, has an influence on the adjustment of the extractant flow and the detergent flow. To ensure the purity at the outlets, it is set that control quantity constraints of the rare earth extraction process are as follows: $11.7870 \leq u_1 \leq 18.1207$, $5.7415 \leq u_2 \leq 9.7418$; given constraint ranges of controlled quantities are as follows: $0.9435 \leq y_1 \leq 0.9935$, $0.8783 \leq y_2 \leq 0.9383$; control quantity increment constraints are $[-0.05, 0.05]^T$; and a cost coefficient of a steady-state optimization layer is configured as follows: $c_1=-2$, $c_2=-1$, where – represents benefits. With reference to features of the CePr/Nd extraction process, economic optimization is first performed in the steady-state optimization layer to obtain an optimal output value and an optimal working point, thereby providing a control target for a dynamic control layer.

It can be learned from FIG. 6 to FIG. 9 that, the double-layer structured prediction controller for the rare earth extraction process can adjust the extractant and the detergent flow in time, so that the monitoring-stage component content is stabilized at the optimal set value, thus ensuring the quality of product at outlets of both ends, and also meeting the requirements for economy, high efficiency, and stability on the practical rare earth extraction process.

Embodiment 4

Embodiment 4 of the present invention provides a prediction control system for component contents in a rare earth extraction process.

Figure 10:
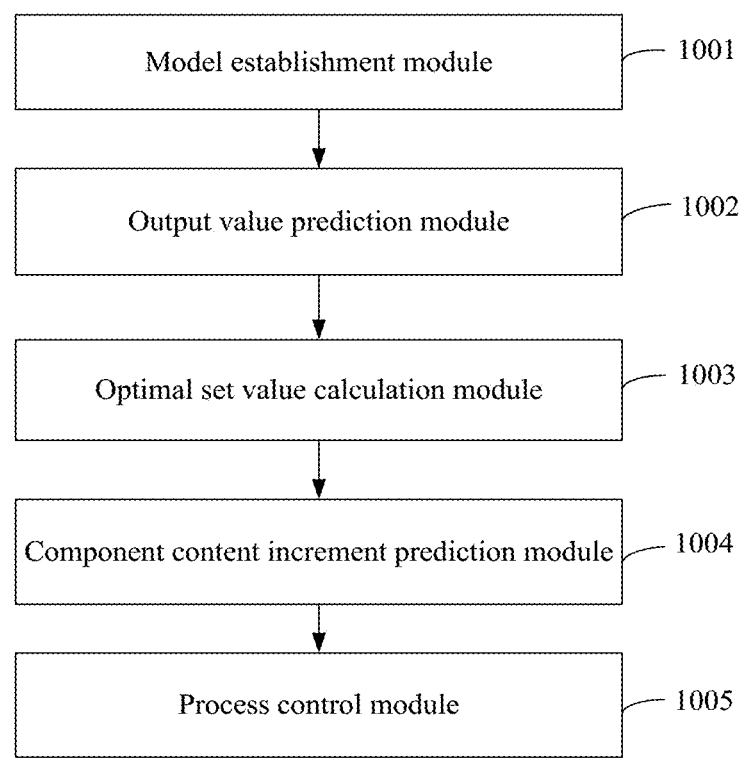
FIG. 10 is a structural composition block diagram of a prediction control system for component contents in a rare earth extraction process according to the present invention.

As shown in FIG. 10, the prediction control system includes: a model establishment module 1001, configured to establish an Elman neural network model of a rare earth extraction process; an output value prediction module 1002, configured to obtain a predicted output value of the rare earth extraction process through the Elman neural network model of the rare earth extraction process; an optimal set value calculation module 1003, configured to calculate an optimal set value through steady-state optimization; a component content increment prediction module 1004, configured to dynamically predict an extractant flow increment and a detergent flow increment based on the predicted output value and the optimal set value; and a process control module 1005, configured to control component contents in the rare earth extraction process according to the extractant flow increment and the detergent flow increment.

Embodiment 5

Embodiment 5 of the present invention provides a preferred implementation manner of a prediction control system for component contents in a rare earth extraction process. However, the implementation of the present invention is not limited to the implementation manner defined in Embodiment 5 of the present invention.

The model establishment module 1001 specifically includes: a model establishment sub-module, configured to establish an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

where $u(k-1)$ represents an input of the Elman neural network model, $u(k-1)=[u_1(k-1),u_2(k-1)]^T$; $y(k)$ represents a predicted output value, $y(k)=[y_1(k),y_2(k)]^T$, $y_1(k)$ represents a predicted output value in an extraction stage, and $y_2(k)$ represents a predicted output value in a washing stage; $x(k)$ represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and a training sub-module, configured to train the Elman neural network model, and obtain the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process.

The optimal set value calculation module 1003 specifically includes: an economic performance optimization target function establishment sub-module, configured to establish an economic performance optimization target function of the component contents in the rare earth extraction process:

$$\min M = c_1 u_1 + c_2 u_2, \text{ s.t.} \begin{cases} u_{min} \leq u \leq u_{max} \\ y_{min} \leq y \leq y_{max} \\ \Delta u_{min} \leq \Delta u \leq \Delta u_{max} \end{cases},$$

where $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, $u_{max}$ and $u_{min}$ are an upper-bound constraint and a lower-bound constraint of the operation variable u respectively, $\Delta u$ represents an operation variable increment, and $\Delta u_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and an economic performance optimization target function solving sub-module, configured to solve the economic performance optimization target function, to obtain the optimal set value.

The component content increment prediction module 1004 specifically includes: a component content deviation optimization target function establishment sub-module, configured to establish a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

where P represents a maximum prediction length, q(j) represents an error weighting coefficient that is j steps ahead, y(k+j) represents a predicted output value that is j steps ahead, and w(k+j) represents a tracked reference trajectory that is j steps ahead; w(k+j)=αw(k+j−1)+(1−α)$y_r$(k+j), where a is a softness factor, 0<α<1; w(k+j−1) represents a tracked reference trajectory that is (j−1) steps ahead, and $y_r$(k+j) represents an optimal set value that is j steps ahead; M represents a control length, r(j) represents a control weighting coefficient that is j steps ahead, and Δu(k+j−1) represents a control increment that is (j−1) steps ahead; and a component content deviation optimization target function solving sub-module, configured to solve the component content deviation optimization target function to obtain the extractant flow increment and the detergent flow increment.

The component content deviation optimization target function solving sub-module specifically includes: a function vectorization unit, configured to vectorize the component content deviation optimization target function to obtain a vector form of the component content deviation optimization target function: $J=(Y-W)^T Q(Y-W)+R\Delta U^T \Delta U$, where W represents a tracked reference trajectory vector W=[w(k+1), w(k+2), ..., w(k+P)]$^T$, Y represents a predicted output value vector Y=[y(k+1), y(k+2), ..., y(k+P)]$^T$; y(k+1), y(k+2), and y(k+P) represent predicted output values that are 1 step ahead, 2 steps ahead, and P steps ahead respectively, ΔU represents a control increment vector, Q represents a target weighting matrix, and R represents a control weighting matrix; a solution function obtaining unit, configured to substitute Y=GΔU+F into the vector form of the component content deviation optimization target function to obtain a solution function, $$\begin{aligned} J &= (G\Delta U + F - W)^T Q(G\Delta U + F - W) + R\Delta U^T \Delta U \\ &= (W-F)^T Q(W-F) - (W-F)^T QG\Delta U - \Delta U^T G^T Q(W-F) + \\ &\quad \Delta U^T G^T QG\Delta U + \Delta U^T R\Delta U \end{aligned}$$

where F=[ƒ(k+1), ƒ(k+2), ..., ƒ(k+P)]$^T$ is a transfer function value vector of a hidden-layer neuron of the Elman neural network model of the rare earth extraction process, ƒ(k+1), ƒ(k+2), ..., θ(k+P) represent transfer function values of the hidden-layer neuron of the Elman neural network model of the rare earth extraction process which are 1 step ahead, 2 steps ahead, and P steps ahead respectively, and G∈R$^{(2\times M)\times(2\times M)}$ represents a control matrix; and a solving unit, configured to make ∂J/∂ΔU=0, solve the solution function to obtain a control increment optimal value ΔU*, where ΔU*=$(G^T QG+RI)^{-1} QG^T(W-F)$, and obtain the extractant flow increment and the detergent flow increment, I being a unit matrix.

Compared with the prior art, the present invention achieves the following beneficial effects: Due to the characteristics of strong coupling and nonlinearity of the rare earth extraction process, a static model for components at outlets of both ends is usually employed for the process design. However, the conventional static model cannot implement online prediction and real-time adjustment of the contents of rare earth element components at each cascade stage in the rare earth extraction process, and a process model cannot be constructed, thus affecting the subsequent control effect of the contents of the rare earth elements. In the present technical solution, sample data generated during operation of different stages of the CePr/Nd extraction process is analyzed first, and major parameters influencing the extraction process are determined according to characteristics of the data and actual requirements on site, to establish an Elman neural network model and obtain a prediction result. A double-layer structured prediction control method for component contents in a rare earth extraction process is proposed. Economic performance in the extraction process is fully considered. A controlled output expected target value is calculated through a steady-state optimization layer of the double-layer structured prediction control, so as to replace a given value based on human experience, thus implementing optimization of a set point. Then, an optimal control quantity of the rare earth extraction process is obtained through a dynamic prediction control layer of the design, and it is ensured that the quality of product at both ends is optimized.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

The principles and implementations of the present invention have been described with reference to specific examples. The description of the above embodiments is only for facilitating understanding of the method and the core idea of the present invention, and the described embodiments are only a part of the embodiments of the present invention. All other embodiments obtained by a person of ordinary skill in the art based on the embodiments of the present invention without departing from the inventive scope are the scope of the present invention.

What is claimed is:

1. A prediction control method for component contents in a rare earth extraction process, wherein the prediction control method comprises the following steps:
   establishing an Elman neural network model of a rare earth extraction process;
   obtaining a predicted output value of the rare earth extraction process through the Elman neural network model of the rare earth extraction process;
   calculating an optimal set value through steady-state optimization;
   dynamically predicting an extractant flow increment and a detergent flow increment based on the predicted output value and the optimal set value; and
   controlling component contents in the rare earth extraction process according to the extractant flow increment and the detergent flow increment.

2. The prediction control method for component contents in a rare earth extraction process according to claim 1, wherein the establishing an Elman neural network model of a rare earth extraction process specifically comprises:

establishing an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

wherein u(k−1) represents an input of the Elman neural network model, $u(k-1)=[u_1(k-1),u_2(k-1)]^T$; y(k) represents a predicted output value, $y(k)=[y_1(k), y_2(k)]^T$, $y_1(k)$ represents a predicted output value in an extraction stage, and $y_2(k)$ represents a predicted output value in a washing stage; x(k) represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and training the Elman neural network model, and obtaining the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process.

3. The prediction control method for component contents in a rare earth extraction process according to claim 1, wherein the calculating an optimal set value through steady-state optimization specifically comprises:

establishing an economic performance optimization target function of the component contents in the rare earth extraction process:

$$\min M = c_1 u_1 + c_2 u_2,$$

$$\text{s.t.} \begin{cases} u_{min} \le u \le u_{max} \\ y_{min} \le y \le y_{max} \\ \Delta u_{min} \le \Delta u \le \Delta u_{max} \end{cases},$$

wherein $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, and $u_{max}$ and $u_{min}$ are an upper-bound constraint and a lower-bound constraint of the operation variable u respectively, $\Delta u$ represents an operation variable increment, and $\Delta u_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and solving the economic performance optimization target function, to obtain the optimal set value.

4. The prediction control method for component contents in a rare earth extraction process according to claim 1, wherein the dynamically predicting an extractant flow increment and a detergent flow increment based on the predicted output value and the optimal set value specifically comprises:

establishing a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

wherein P represents a maximum prediction length, q(j) represents an error weighting coefficient that is j steps ahead, y(k+j) represents a predicted output value that is j steps ahead, and w(k+j) represents a tracked reference trajectory that is j steps ahead; $w(k+j)=\alpha w(k+j-1)+(1-\alpha)y_r(k+j)$, wherein α is a softness factor, 0<α<1, w(k+j−1) represents a tracked reference trajectory that is (j−1) steps ahead, and $y_r(k+j)$ represents an optimal set value that is j steps ahead; M represents a control length, r(j) represents a control weighting coefficient that is j steps ahead, and Δu(k+j−1) represents a control increment that is (j−1) steps ahead; and solving the component content deviation optimization target function to obtain the extractant flow increment and the detergent flow increment.

5. The prediction control method for component contents in a rare earth extraction process according to claim 4, wherein the solving the component content deviation optimization target function to obtain the extractant flow increment and the detergent flow increment specifically comprises:

vectorizing the component content deviation optimization target function to obtain a vector form of the component content deviation optimization target function: $J=(Y-W)^T Q(Y-W)+R\Delta U^T \Delta U$, wherein W represents a tracked reference trajectory vector, $W=[w(k+1),w(k+2),\ldots,w(k+P)]^T$, Y represents a predicted output value vector, ΔU represents a control increment vector, Q represents a target weighting matrix, and R represents a control weighting matrix;

substituting $Y=G\Delta U+F$ into the vector form of the component content deviation optimization target function to obtain a solution function, $$\begin{aligned} J &= (G\Delta U + F - W)^T Q(G\Delta U + F - W) + R\Delta U^T \Delta U \\ &= (W-F)^T Q(W-F) - (W-F)^T QG\Delta U - \Delta U^T G^T Q(W-F) + \\ &\quad \Delta U^T G^T QG\Delta U + \Delta U^T R\Delta U \end{aligned},$$

wherein $F=[f(k+1), f(k+2), \ldots, f(k+P)]^T$ is a transfer function value vector of a hidden-layer neuron of the Elman neural network model of the rare earth extraction process, $f(k+1), f(k+2), \ldots, f(k+P)$ represent transfer function values of the hidden-layer neuron of the Elman neural network model of the rare earth extraction process which are 1 step ahead, 2 steps ahead, and P steps ahead respectively, and $G \in R^{(2 \times M) \times (2 \times M)}$ represents a control matrix; and making ∂J/∂ΔU=0, solving the solution function to obtain a control increment optimal value ΔU*, wherein $\Delta U^* = (G^T QG+RI)^{-1} QG^T(W-F)$, and obtaining the extractant flow increment and the detergent flow increment, I being a unit matrix.

6. A prediction control system for component contents in a rare earth extraction process, wherein the prediction control system comprises:
- a model establishment module, configured to establish an Elman neural network model of a rare earth extraction process;
- an output value prediction module, configured to obtain a predicted output value of the rare earth extraction process through the Elman neural network model of the rare earth extraction process;
- an optimal set value calculation module, configured to calculate an optimal set value through steady-state optimization;
- a component content increment prediction module, configured to dynamically predict an extractant flow increment and a detergent flow increment based on the predicted output value and the optimal set value; and
- a process control module, configured to control component contents in the rare earth extraction process according to the extractant flow increment and the detergent flow increment.

7. The prediction control system for component contents in a rare earth extraction process according to claim 6, wherein the model establishment module specifically comprises:
- a model establishment sub-module, configured to establish an Elman neural network model:

$$\begin{cases} x(k) = f(w^1 x_c(k) + w^2 u(k-1) + \theta_1) \\ x_c(k) = x(k-1) \\ y(k) = g(w^3 x(k) + \theta_2) \end{cases},$$

wherein $u(k-1)$ represents an input of the Elman neural network model, $u(k-1)=[u_1(k-1),u_2(k-1)]^T$; $y(k)$ represents a predicted output value, $y(k)=[y_1(k),y_2(k)]^T$, $y_1(k)$ represents a predicted output value in an extraction stage, and $y_2(k)$ represents a predicted output value in a washing stage; $x(k)$ represents an output of a hidden layer; $x_c(k)$ represents an output of a structure layer; $w^1$ represents a weight value connecting the structure layer and the hidden layer; $w^2$ represents a weight value connecting an input layer and the hidden layer; $w^3$ represents a weight value connecting the hidden layer and an output layer; $\theta_1$ and $\theta_2$ represent thresholds of the input layer and the hidden layer respectively; $f(*)$ represents a transfer function of a hidden-layer neuron, and $g(*)$ represents a transfer function of the output layer; and
- a training sub-module, configured to train the Elman neural network model, and obtain the weight value connecting the structure layer and the hidden layer, the weight value connecting the input layer and the hidden layer, the weight value connecting the hidden layer and the output layer, the threshold of the input layer, and the threshold of the output layer, to obtain the Elman neural network model of the rare earth extraction process.

8. The prediction control system for component contents in a rare earth extraction process according to claim 6, wherein the optimal set value calculation module specifically comprises:
- an economic performance optimization target function establishment sub-module, configured to establish an economic performance optimization target function of the component contents in the rare earth extraction process:

$$\min M = c_1 u_1 + c_2 u_2,$$

$$\text{s.t.} \begin{cases} u_{min} \le u \le u_{max} \\ y_{min} \le y \le y_{max} \\ \Delta u_{min} \le \Delta u \le \Delta u_{max} \end{cases},$$

wherein $u_1$ and $u_2$ represent an extractant flow and a detergent flow respectively, $u=[u_1,u_2]^T$ represents an operation variable, $c_1$ and $c_2$ represent costs of inputting a unit discharge of extractant and inputting a unit discharge of detergent respectively, $c=[c_1,c_2]^T$ represents a cost variable, $u_{max}$ and $u_{min}$ are an upper-bound constraint and a lower-bound constraint of the operation variable u respectively, $\Delta u$ represents an operation variable increment, and $\Delta_{max}$ and $\Delta u_{min}$ represent an upper-bound constraint and a lower-bound constraint of the operation variable increment $\Delta u$ respectively; $y_1$ represents component contents in an extraction stage, $y_1$ represents component contents in a washing stage, and $y=[y_1,y_2]^T$ represents a controlled variable of the extraction process; and $y_{max}$ and $y_{min}$ are an upper bound and a lower bound meeting a control requirement which are obtained through optimization calculation; and
- an economic performance optimization target function solving sub-module, configured to solve the economic performance optimization target function, to obtain the optimal set value.

9. The prediction control system for component contents in a rare earth extraction process according to claim 6, wherein the component content increment prediction module specifically comprises:
- a component content deviation optimization target function establishment sub-module, configured to establish a component content deviation optimization target function based on the predicted output value and the optimal set value:

$$J = \sum_{j=1}^{P} q(j)[y(k+j) - w(k+j)]^2 + \sum_{j=1}^{M} r(j)[\Delta u(k+j-1)]^2,$$

wherein P represents a maximum prediction length, $q(j)$ represents an error weighting coefficient that is j steps ahead, $y(k+j)$ represents a predicted output value that is j steps ahead, and $w(k+j)$ represents a tracked reference trajectory that is j steps ahead; $w(k+j)=\alpha w(k+j-1)+(1-\alpha)y_r(k+j)$, wherein $\alpha$ is a softness factor, $0<\alpha<1$; $w(k+j-1)$ represents a tracked reference trajectory that is (j-1) steps ahead, and $Y_r(k+j)$ represents an optimal set value that is j steps ahead; M represents a control length, $r(j)$ represents a control weighting coefficient that is j steps ahead, and $\Delta u(k+j-1)$ represents a control increment that is (j-1) steps ahead; and
- a component content deviation optimization target function solving sub-module, configured to solve the component content deviation optimization target function to obtain the extractant flow increment and the detergent flow increment.

10. The prediction control system for component contents in a rare earth extraction process according to claim 6, wherein the component content deviation optimization target function solving sub-module specifically comprises:
- a function vectorization unit, configured to vectorize the component content deviation optimization target function to obtain a vector form of the component content deviation optimization target function: $J=(Y-W)^T Q$ (Y−W)+RΔU$^T$ΔU, wherein W represents a tracked reference trajectory vector, W=[w(k+1),w(k+2), ..., w(k+P)]$^T$, Y represents a predicted output value vector, ΔU represents a control increment vector, Q represents a target weighting matrix, and R represents a control weighting matrix;

a solution function obtaining unit, configured to substitute Y=GΔU+F into the vector form of the component content deviation optimization target function to obtain a solution function, $$\begin{aligned} J &= (G\Delta U + F - W)^T Q(G\Delta U + F - W) + R\Delta U^T \Delta U \\ &= (W-F)^T Q(W-F) - (W-F)^T Q G\Delta U - \Delta U^T G^T Q(W-F) + \\ &\quad \Delta U^T G^T Q G\Delta U + \Delta U^T R\Delta U \end{aligned}$$

wherein F=[𝑓(k+1), 𝑓(k+2), ..., 𝑓(k+P)]$^T$ is a transfer function value vector of a hidden-layer neuron of the Elman neural network model of the rare earth extraction process, 𝑓(k+1), 𝑓(k+2), ..., 𝑓(k+P) represent transfer function values of the hidden-layer neuron of the Elman neural network model of the rare earth extraction process which are 1 step ahead, 2 steps ahead, and P steps ahead respectively, and G∈R$^{(2×M)×(2×M)}$ represents a control matrix; and a solving unit, configured to make ∂J/∂ΔU=0, solve the solution function to obtain a control increment optimal value ΔU*, wherein ΔU*=(G$^T$QG+RI)$^{-1}$QG$^T$(W−F), and obtain the extractant flow increment and the detergent flow increment, I being a unit matrix.

* * * * *